Jan. 10, 1961 V. R. BALLINGER 2,967,533
COLLAPSIBLE PORTABLE ENCLOSURE AND SUN SHIELD APPARATUS
Filed Nov. 18, 1959 7 Sheets-Sheet 1

INVENTOR.
VIRGIL R. BALLINGER

Jan. 10, 1961 V. R. BALLINGER 2,967,533
COLLAPSIBLE PORTABLE ENCLOSURE AND SUN SHIELD APPARATUS
Filed Nov. 18, 1959 7 Sheets-Sheet 2

INVENTOR.
VIRGIL R. BALLINGER

INVENTOR.
VIRGIL R. BALLINGER

Jan. 10, 1961  V. R. BALLINGER  2,967,533
COLLAPSIBLE PORTABLE ENCLOSURE AND SUN SHIELD APPARATUS
Filed Nov. 18, 1959  7 Sheets-Sheet 5

INVENTOR.
VIRGIL R. BALLINGER

INVENTOR.
VIRGIL R. BALLINGER

Jan. 10, 1961 V. R. BALLINGER 2,967,533
COLLAPSIBLE PORTABLE ENCLOSURE AND SUN SHIELD APPARATUS
Filed Nov. 18, 1959 7 Sheets-Sheet 7

*INVENTOR.*
VIRGIL R. BALLINGER

United States Patent Office 2,967,533
Patented Jan. 10, 1961

2,967,533

COLLAPSIBLE PORTABLE ENCLOSURE AND SUN SHIELD APPARATUS

Virgil R. Ballinger, 12121 Washington Blvd., Los Angeles, Calif.

Filed Nov. 18, 1959, Ser. No. 853,899

6 Claims. (Cl. 135—1)

The present invention consists of enclosure apparatus including structural frame members comprising a collapsible knock-down frame and thin-sheet flexible material comprising cover means adapted to fit over the frame when in fully assembled position, whereby to effectively define an enclosure substantially closed in by the thin-sheet material of the cover means when in one position, and with the frame including a plurality of pairs of panel frame members carrying corresponding panel portions of the thin-sheet material of the cover means and adapted to be moved between vertical positions, wherein the portions of the cover means carried thereby effectively comprise sides of the above-mentioned enclosure, and substantially horizontal positions, wherein the portions of the cover means carried by the panel frame members of the frame extend outwardly from the main rectangular portion of the frame whereby to effectively comprise a large area sun shield adapted to shade a very substantial area thereunder.

It should also be noted that the panel frame members of the frame and the portions of the thin-sheet material of the cover means carried thereby may be moved between the extended horizontal sun shield position and the downwardly directed vertical enclosure-side-wall-forming position and maintained in several discrete positions therebetween.

It should be noted that, in a preferred form of the invention, the cover means can be quickly and easily completely disengaged from the frame to facilitate folding it into a very small package for storage or portability during periods of non-use, and it should further be noted that the frame is so arranged that all of the portions thereof which join at any given corner are pivotally interconnected by corner hinge members for pivotal movement in two mutually perpendicular planes, and that the structural or frame members themselves are so formed that all of them joined at any given corner hinge member may be pivotally swung downwardly into nesting relationship with respect to each other to minimize the space volume of the collapsed frame whereby to facilitate storage and portability of the collapsed frame, which is customarily adapted to be carried, along with the folded cover means, in a small carrying case during periods of non-use and when the apparatus is to be transported to a use location.

It should also be noted that to further reduce the size of the collapsed frame, the various structural or frame members thereof may consist of several elements slidably or effectively telescopically engaged for extension to their full length or for retraction to a greatly shortened length when said structural or frame members are to be pivotally folded down into the collapsed nesting relationship mentioned hereinabove, which, in one preferred form, is further facilitated by having four top frame members of the frame, which normally define a substantially rectangular top portion of the frame as seen in top plan view, each centrally provided with hinge means adapted to allow each of said four top frame members to be folded downwardly into a substantially V-shaped configuration, thus facilitating the complete collapsing of the frame into the nested relationship referred to above.

It should further be noted that the apparatus of the present invention may include an attachment for converting a bottom portion of the fully assembled apparatus into an infant's play pen.

It is an object of the present invention to provide enclosure and sun shield apparatus of the type generally described above, wherein the collapsible knock-down frame includes four normally vertical corner frame members, four normally horizontal top frame members, four pairs of panel frame members normally positionable in either a horizontal position, a vertical position, or selected discrete positions therebetween and including four corner hinge members, each pivotally joining adjacent ends of one of said normally vertical corner frame members, two adjacent ends of said normally horizontal top frame members and two adjacent ends of said panel frame members from two different pairs thereof for pivotal movement with respect to said corner frame member in two mutually perpendicular planes between fully extendable positions lying in a horizontal plane and fully collapsed vertically oriented positions in closely adjacent nested relationship with respect to said vertically directed corner frame member, whereby to provide a frame adapted to easily fold into an extremely small space volume and yet quickly and easily be fully assembled so as to define a frame of substantially rectangular elevational configuration and substantially rectangular plan-view configuration and with four pairs of panel frame members pivotally carried at the top of each side thereof for movement between an extended horizontal sun shield position and a downwardly directed side enclosure forming position when carrying cover means comprising thin-sheet material removably extending across the top of the frame and engaging the outer ends of each of the four pairs of panel frame members.

It is a further object to provide enclosure and sun shield apparatus of the character defined above wherein each of the four normally vertical corner frame members consists of first and second flange portions integrally joined together at an apex in substantially perpendicular relationship as viewed in cross-section and with the apex of each of said corner frame members being inwardly directed toward the center of the rectangle effectively defined by said four corner frame members, as seen in plan view, and wherein each of said corner hinge members is effectively fastened to the top end of a corresponding one of said corner frame members and pivotally mounts on opposite sides thereof one of said top frame members and one of each pair of said panel frame members for pivotal movement substantially parallel to one of said flange portions of said corner frame member, and pivotally mounts perpendicular thereto a second one of said top frame members perpendicular to said first-mentioned one of said top frame members and, on the opposite side of said corner frame member, pivotally mounts one of a different pair of said panel frame members perpendicular to the first-mentioned one of said panel frame members for pivotal movement in planes substantially parallel to the second flange portion of said corner frame member, which is perpendicular to said first flange portion thereof, whereby to pivotally mount said top and panel frame members for extension into a substantially horizontal plane and for pivotal downward collapsing movement into vertically oriented nesting relationship with respect to the perpendicular first and second flange portions of the corresponding corner frame member to provide a compact collapsed frame structure.

It is a further object to provide enclosure and sun shield apparatus of the character defined above, wherein each of the normally vertical four corner frame members consists of a plurality of longitudinally telescopically engaged elements which may be extended into a fully extended position and which may be retracted into a fully retracted non-use position, wherein each of the four top frame members consists of two elements symmetrically positioned on each side of a centrally hinged portion thereof, and wherein each of the panel frame members of the four pairs thereof consists of longitudinally telescopically engaged elements which may be extended to a fully extended position and which may be retracted into a fully retracted non-use position.

It is a further object to provide enclosure and sun shield apparatus of the character defined above, including spring means effectively connected to adjacent panel frame members of different pairs thereof (usually by means of biasing spring attachment means carried by the adjacent corner hinge means) and normally biasing each pair of panel members and the portion of the cover means carried thereby into an extended horizontal position, but allowing same to be forcibly downwardly pivotally moved against the action of said biasing spring means out of said extended horizontal sun shield position into a vertical position substantially closing off a corresponding side of the enclosure formed by the frame.

It is a further object to provide enclosure and sun shield apparatus of the character defined above, including fastening means connected to the panel effectively formed by each pair of panel frame members and the panel portion of the flexible cover means carried thereby, and controllably lockable with respect to the corresponding corner frame member in a plurality of selected positions whereby to hold the vertically pivotally movable panel in any of a plurality of corresponding selected downwardly pivoted positions lying between the normal horizontal extended sun shield position and the vertical completely downwardly deflected enclosure-side-defining position.

It is a further object to provide enclosure and sun shield apparatus of the character defined in any of the preceding objects, provided with an attachment for the bottom portion of the fully assembled and mounted apparatus for effectively converting it into an infant's play pen.

It is a further object to provide a portable knock-down enclosure and sun shield apparatus of the character set forth in any of the preceding objects, which is of extremely simple, cheap, foolproof, easy-to-assemble, easy-to-collapse, and readily portable construction, such as to facilitate widespread use thereof.

Further objects will be apparent to persons skilled in the art after a careful study hereof.

For the purpose of clarifying the nature of the present invention, one exemplary embodiment, and an attachment for converting the apparatus into an infant's play pen, are illustrated in the hereinbelow-described figures of the accompanying seven sheets of drawings, and are described in detail hereinafter.

11 to the same fastening clamp means as that shown in Fig. 11.

Generally speaking, the collapsible portable enclosure and sun shield apparatus of the present invention may be said to include a frame made up of a plurality of pivotally interconnected frame members, certain of which, in one preferred form, are telescopically extendable and shortenable; which frame includes four vertically pivotally swingable panel portions, each including a pair of spaced panel frame members adapted to extend outwardly with respect to the remainder of the frame when in horizontal position and adapted to extend vertically downwardly alongside of the other vertical frame members at the corners of the frame when in the other extreme position, and with the frame being adapted to be covered over the top of the center portion thereof and over each of the panel portions thereof with flexible cover means of thin-sheet material whereby to effectively provide a large surface area sun shield when each of the panels is in the extended horizontal position and whereby to effectively, and to a great extent, enclose all four sides of the frame within the cover means when the panels are swung downwardly into the lowermost extreme position, which may be considered an enclosure-side-defining position.

Also broadly speaking, the invention may be said to include biasing spring means which normally maintain all of the four panels in the extended horizontal sun shield position, but which allow the panels to be forcibly moved downwardly to any desired extent from the sun shield position toward the enclosure-side-defining position and to be retained in said adjusted position by suitable fastening or locking means.

Also broadly speaking, it should be noted that the entire cover means may be detached from the frame for convenient folding into a small compact package, after which the frame is telescopically shortened and pivotally folded with each frame member joining at a given corner swinging vertically downwardly into a nested relationship with respect to the adjacent frame members, whereby to provide an extremely small-volume, compact, folded, collapsed frame which may be stored with the folded cover means in a small carrying case for storage during periods of non-use or for easy portability between use locations.

In the specific example illustrated, the frame includes four normally vertical corner members, such as indicated at 20, four top frame members, such as indicated generally at 21, and four pairs of panel frame members, such as indicated generally at 22. The apparatus also includes four corner hinge means, such as indicated generally at 23, each of which is adapted to effectively join together adjacent ends of two adjacent top frame members 21 in perpendicular relationship with respect to each other, and each of which is also adapted to join together for vertical pivotal movement in two mutually perpendicular planes adjacent ones of two adjacent but different pairs of the panel frame members 22.

Figure 1:
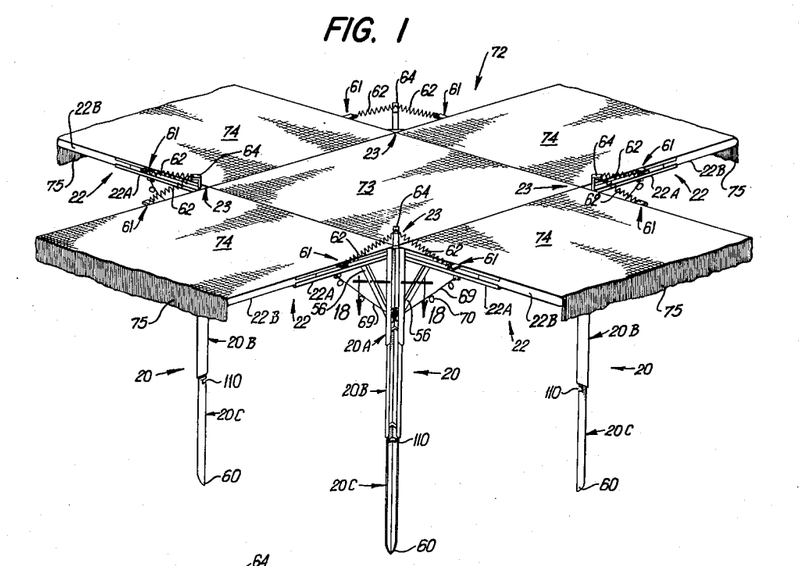
Fig. 1 is a perspective view illustrating one embodiment of the apparatus of the present invention in assembled, fully extended sun shield position. However, the lower sharpened tips of each of the four corner frame members is shown prior to being inserted downwardly into an underlying ground or sand surface. This is done only to facilitate understanding and to fully show the sharpened tips.

In the specific example illustrated, it should be noted that only the corner hinge means and pivotally connected frame members adjacent thereto in the near corner of the frame shown in Fig. 1 will be specifically described in detail since all of the others are similar, and further and detailed description thereof would be redundant.

In the specific example illustrated, it should be noted that each of the corner frame members indicated generally at 20 consists of three elements, 20A, 20B, and 20C, which are telescopically longitudinally slidably engaged for extension and retraction. It should be noted that the upper member 20A consists of a first flange portion 20Aa and a second flange portion 20Ab, which are perpendicularly related to each other and joined at an apex 20Ac with outer edges of each of the flanges 20Aa and 20Ab being inwardly turned as indicated at 20Ad and 20Ae whereby to slidably receive and retain the similarly shaped next lowermost or second element, indicated generally at 20B, which has correspondingly shaped portions, though slightly smaller. It should also be noted that the third or lowermost element 20C (best shown in Fig. 9) is generally similarly shaped, having flange portions 20Ca and 20Cb but does not have the inwardly turned edges carried thereby. It will readily be understood that this provides an arrangement where each of the three elements 20A, 20B, and 20C may be slidably extended and retracted with respect to each other and locked in extended position by the locking means indicated generally at 24 in Figs. 5 and 10 and the locking means indicated generally at 25 in Figs. 5 and 9. It will be noted that the locking means 24 consists of a resilient member having one portion 24' fastened by suitable fastening means, as indicated at 26, to the flange portion 20Ba and having another portion 27 provided with a finger actuatable lever 28 and carrying a projecting pin 29 adapted to pass through aligned apertures 30 and 31 in the flanges 20Bb and 20Ab.

Figure 9:
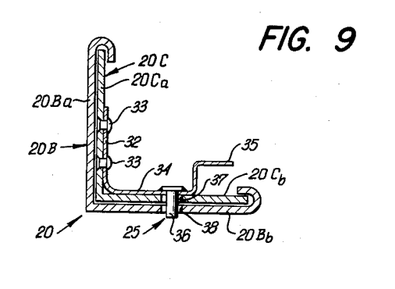
Fig. 9 is an enlarged cross-sectional view of the normally vertical corner frame member taken in the direction of the arrows 9—9 of Fig. 5 and shows the telescopic engagement and the locking in extended relation of the bottom two of the three telescopically engaged elements comprising said corner frame member.
Figure 10:
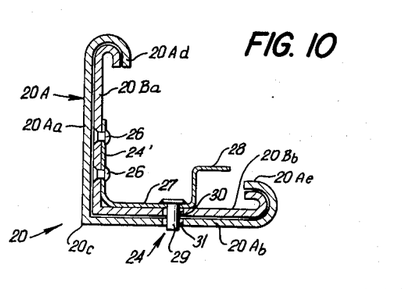
Fig. 10 is an enlarged cross-sectional view of the normally vertical corner frame member taken in the direction of the arrows 10—10 of Fig. 5 and shows the telescopic engagement and the locking in extended relationship of the top two of the three telescopically engaged elements comprising said corner frame member.
Figures 11, 12:
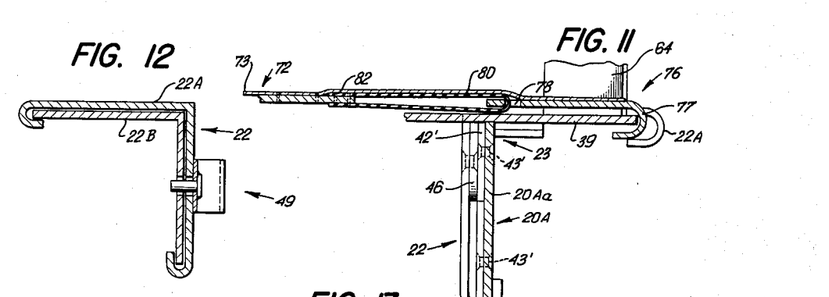
Fig. 11 is an enlarged fragmentary sectional view taken in the direction of the arrows 11—11 of Fig. 5, and including the thin-sheet material of the flexible cover means and the fastening clamp means adapted to be hooked over a top portion of the corner hinge means whereby to effectively removably fasten the cover means with respect thereto.
Fig. 12 is a vertical sectional view taken in the direction of the arrows 12—12 of Fig. 6 showing the telescopic engagement and controlled locking in extended relationship of the two telescopically engaged elements of one of the panel frame members of one of the four pairs thereof.

It will also be noted that the locking means 25 consists of a resilient member having one portion 32 fastened by suitable fastening means as indicated at 33 to the flange portion 20Ca and having another portion 34 provided with a finger actuatable lever 35 and carrying a projecting pin 36 adapted to pass through aligned apertures 37 and 38 in the flanges 20Cb and 20Bb.

Figure 2:
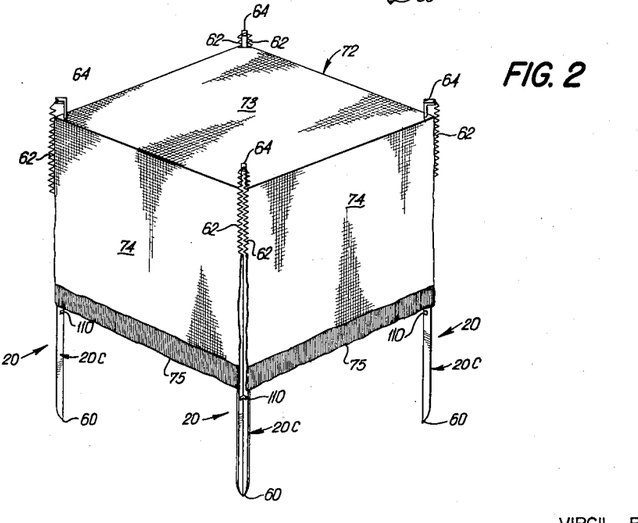
Fig. 2 is a perspective view of the apparatus of Fig. 1 with the four panels pivotally moved downwardly from the horizontally extended sun shield position shown in Fig. 1 into the downwardly directed enclosure-side-defining position shown in Fig. 2.
Figure 3:
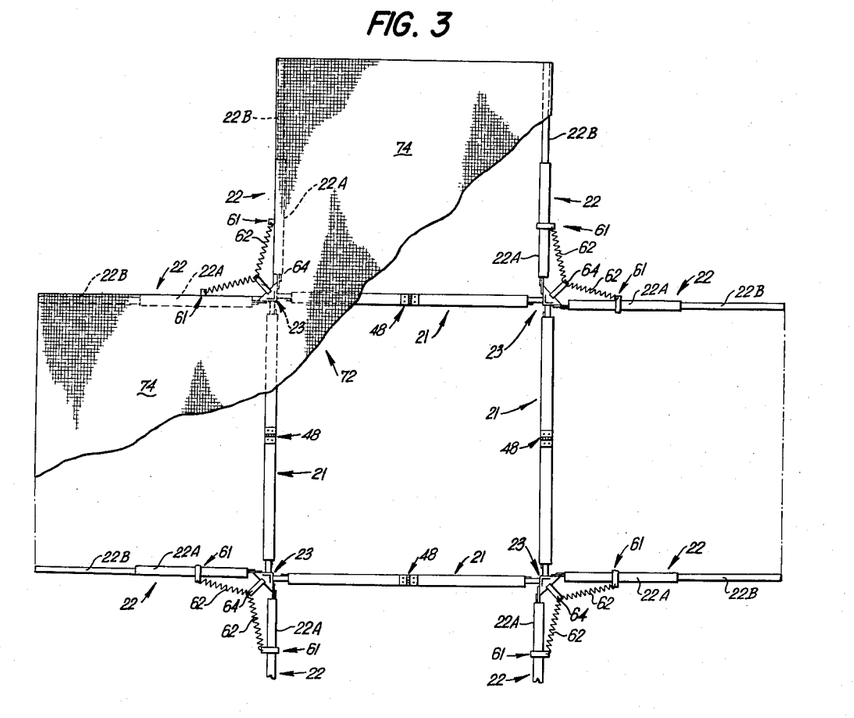
Fig. 3 is a fragmentary top plan view of the apparatus of Fig. 1 with certain portions of the pair of panel frame members of one of the panels broken away for space conservation reasons and with certain portions of the thin-sheet cover means broken away for drawing clarification purposes.

The upper end of the upper element 20A carries across the top thereof a triangularly shaped piece of metal 39 which has an integral portion 40 extending outwardly perpendicular to the flange 20Bb and which has a downwardly bent triangularly shaped integral connecting plate 41 at the inner side thereof with respect to the rectangular top of the frame; said triangular plate 39 also having another downwardly bent integral portion 42, which is fastened by suitable rivet means 43 to the flange 20Ab. It should be noted that the triangular member 39 also has another integral portion 40' similar to the first integral portion 40 just described except that it is perpendicular thereto and is also perpendicular to the other flange 20Ba of the top element 20A of the vertical corner frame member. It should be noted that said second integral portion 40' also has a downwardly bent triangularly shaped integral connecting plate 41' at the inner side thereof with respect to the rectangular top of the frame; said triangular plate 39 also having another downwardly bent integral portion 42' similar to the previously described rectangular plate 42 and also fastened by suitable rivets 43′ similar to the previously described rivets 43. However, the plate 42′ is fastened to the flange 20A*a*. The vertical portion of each of the adjacent elements 21A of the top frame members is provided with a fastening plate 44 connected by pivot pin means 45 to the corresponding triangular connection plate 41 and 41′ for vertical pivotal movement in two mutually perpendicular planes parallel to the flanges 20A*a* and 20A*b* of the vertical corner frame member element 20A. The vertical portion of each of the adjacent elements 22A of the panel frame members, indicated generally at 22, is provided with a fastening plate 46 connected by pivot pin means 47 to the corresponding rectangular plate 42 and 42′ for vertical pivotal movement in two mutually perpendicular planes parallel to the flanges 20A*a* and 20A*b* of the corner frame member element 20A. Thus, it will readily be understood that the corner hinge member, indicated generally at 23, by reason of proper offset clearances and mutually perpendicular pivotal mountings of each of the top frame member elements 21A and each of the panel frame member elements 22A with respect to the upstanding corner frame member element 20A, may move between the fully assembled position of the main frame portion with all of the four pairs of panel frame members 22 in the extended sun shield position shown in Figs. 1 and 3, and a second position with the panel frame member elements 22A swung downwardly anywhere between the extended sun shield positions shown in Figs. 1, 3, and 5 into the fully collapsed positions shown in Fig. 2, and, also, this provides an arrangement where the entire device including the central frame portion may have all of the frame member elements shown in Fig. 5 swung pivotally downwardly from the position shown in Fig. 5 through the position shown in Fig. 8 toward a fully collapsed position with each of said frame member elements in nested relationship with respect to the corresponding corner frame member element 20A, which may have each of the two lower telescopically engaged elements 20B and 20C slidably moved upwardly thereinto into the shortest possible configuration.

Figure 4:
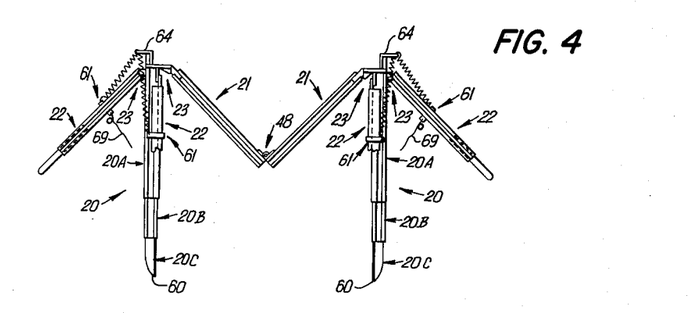
Fig. 4 is a view of the frame after the cover means has been removed and the frame-collapsing operation has just begun.

This collapsing step is partly shown in Fig. 4, and is additionally made possible by reason of the central hinge means, indicated generally at 48, centrally positioned in each of the top frame members, indicated generally at 21.

Figures 8, 15, 16:
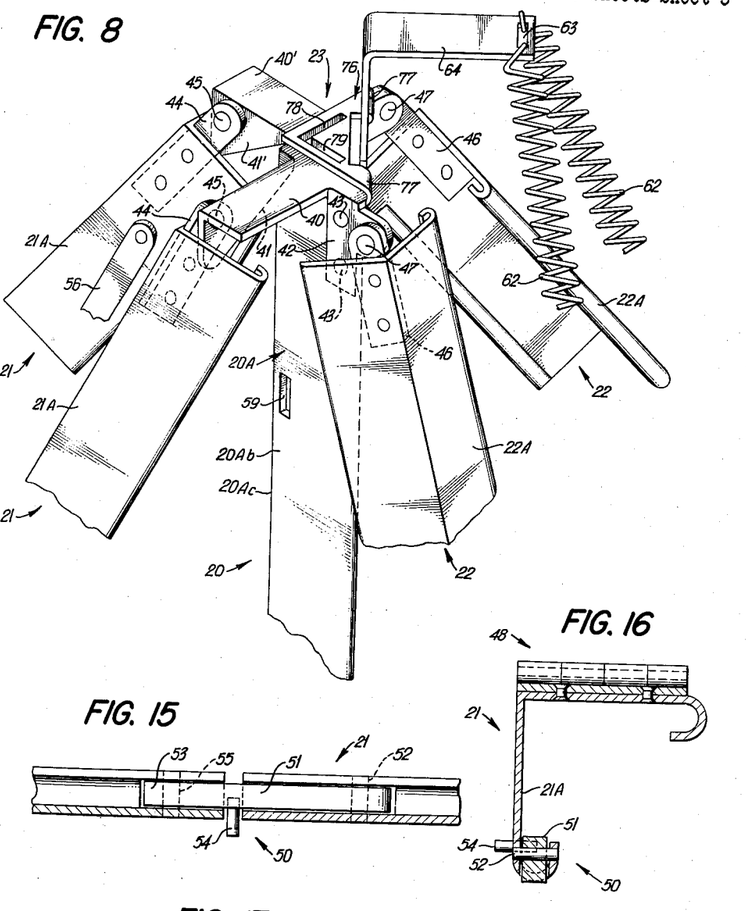
Fig. 8 is a perspective view of the corner of the assembled hinged frame illustrated in Fig. 5, but shows it during the process of downwardly folding each of the frame members joined by the corner hinge means in two mutually perpendicular planes toward a fully nested vertically oriented relationship which will occupy the smallest possible space volume. This is a portion of the collapsing operation which is allowed by the corner hinge means and the central hinge means of each of the four top frame members as illustrated in Fig. 7.
Fig. 15 is a fragmentary sectional view taken in the direction of the arrows 15—15 of Fig. 7 showing a locking means associated with the centrally hinged portion of one of the top frame members and illustrative of the structure of all of them.
Fig. 16 is a fragmentary sectional view taken in the direction of the arrows 16—16 of Fig. 7 and showing the locking means illustrated in Figs. 7 and 15.

This collapsing operation is further facilitated by reason of the fact that each of the panel frame members 22 consists of a first or outer element 22A generally shaped like the outer element 20A of the corner frame member and a telescopically slidably engaged inner element 22B generally similar to the second telescopically engaged corner frame member element 20B, and provided with locking means indicated generally at 49, which is quite similar to the locking means indicated generally at 24 and at 25 carried by each corner frame member 20, thus providing an arrangement whereby each pair of panel frame members 22 can be controllably shortened when the entire device is to be folded into collapsed position, as indicated in part in Fig. 4, and fragmentarily, at one corner of the apparatus, in Fig. 8.

Figures 6, 7:
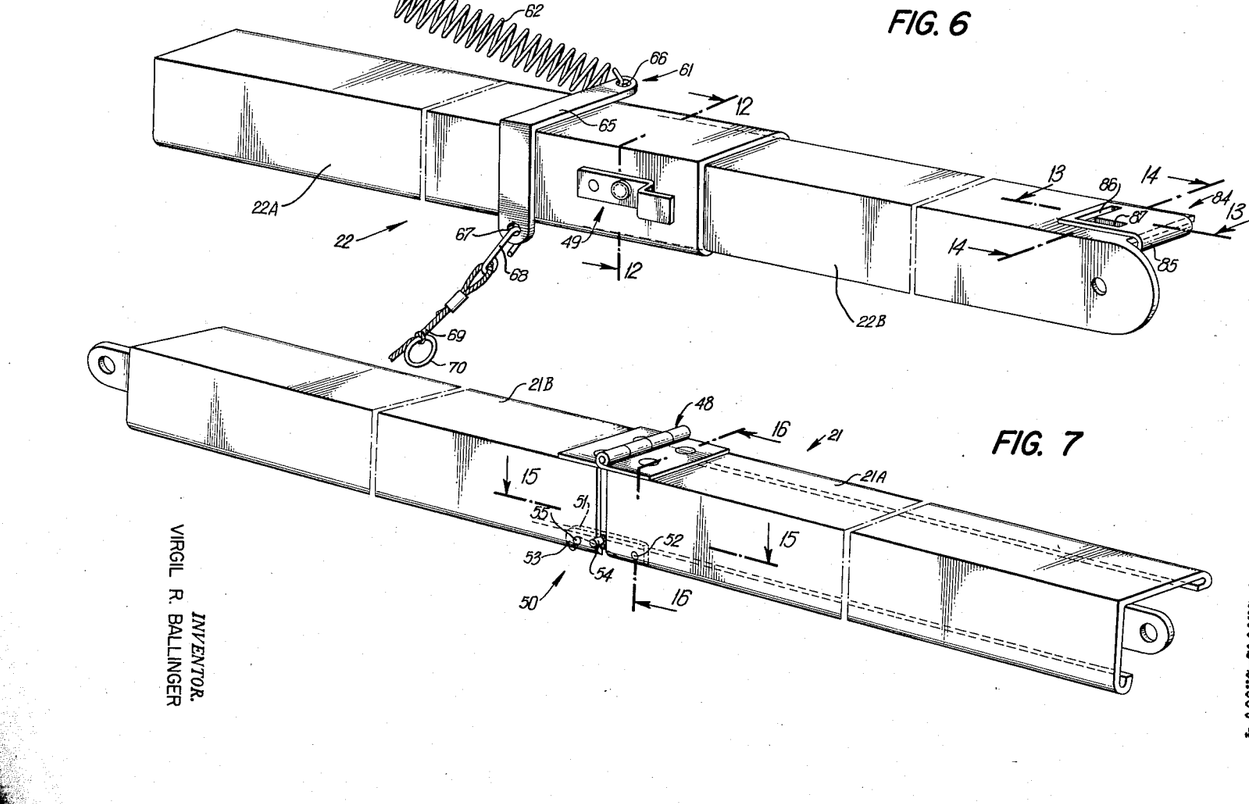
Fig. 6 is an enlarged fragmentary perspective view of the near right panel frame member shown fragmentarily in Fig. 5.
Fig. 7 is a perspective view of the left rear top frame member shown in Fig. 5.

Figs. 7 and 16 illustrate one form of locking means, indicated generally at 50, for effectively locking the two elements 21A and 21B of each top frame member, indicated generally at 21, at their central hinge point indicated generally at 48 so that the entire member 21 will be effectively rigid when locked by the fastening means 50. In the specific example illustrated, the fastening means 50 includes a catch member 51 pivoted, as indicated at 52, to the side portion of the element 21A of the top frame member 21 and having a hook portion 53 at the other end thereof movable by means of an actuating handle portion 54 into locking relationship with a fastening pin 55 whereby to rigidly lock the elements 21A and 21B in straight-line relationship until release of the fastening means 50.

Figures 5, 18, 19:
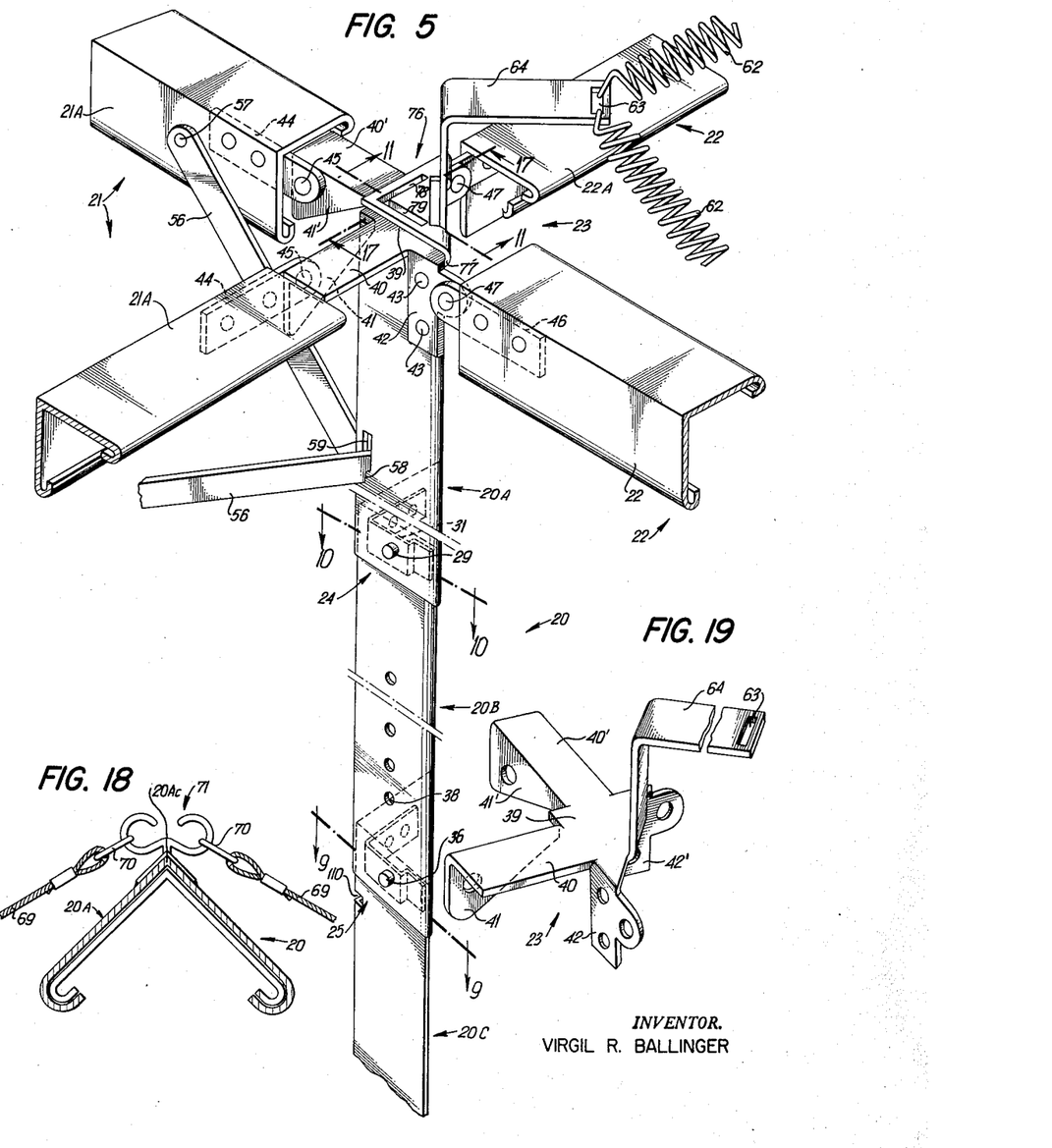
Fig. 5 is an enlarged fragmentary perspective view of the near corner of the frame shown in Fig. 1 as seen from a vantage point above and at the left thereof as viewed in Fig. 1 and with flexible cover means removed for reasons of drawing clarity.
Fig. 18 is an enlarged fragmentary sectional view taken in the direction of the arrows 18—18 of Fig. 1 and illustrates the fastening of the flexible cord fastening or locking means which adjusts and holds each of the vertically movable panels in any of various selected positions between the horizontal extended sun shield position shown in Fig. 1 and the completely downwardly directed enclosure-side-defining position shown in Fig. 2.
Fig. 19 is a perspective view of the corner hinge member illustrated in Figs. 5 and 8, but with parts of the frame removed in order to clarify the structure of the corner hinge member.

Suitable brace means 56 are pivotally fastened, as indicated at 57, to elements 21A of the top frame members 21, and four notched opposite ends, as indicated at 58, are cooperable with corresponding slot means 59 carried by the flange portions 20A*a* and 20A*b* of the top element 20A of the corner frame member, indicated generally at 20, whereby to effectively brace the entire structure, when in the fully assembled position, one corner of which is fragmentarily shown in Fig. 5.

It should be noted that the bottom ends of each of the lower elements 20C of the corner frame members 20 is provided with a sharpened piercing point 60 adapted to easily penetrate an underlying ground surface or sand surface, or the like, to facilitate fixedly mounting the entire frame with respect thereto.

Each of the panel frame member elements 22A is provided with suitable fastening means, indicated generally at 61, adapted to engage one end of the biasing spring means 62 which has its other end fastened to the slot 63 in a biasing spring attachment member 64, which is integrally formed as an extension of the triangular plate 39 comprising the central portion of each corner hinge member 23; said biasing spring attachment means 64 extending upwardly and outwardly from the triangular plate 39 whereby to apply the proper direction of spring biasing force along each of the biasing springs 62 to each of the fastening elements 61 carried by each of the panel frame member elements 22A whereby to normally forcibly bias all of the panel frame members 22 into the extended horizontal position shown in part in Fig. 5 and shown in Fig. 1 after a flexible cover means has been engaged thereover. In the specific example illustrated, the fastening means 61 comprises a right-angle-shaped member 65 rigidly fastened to the outside of the panel frame member element 22A and having a hole 66 at one end engaging the end of the spring 62 and also having a hole 67 at the other end engaging one end 68 of a flexible fastening means 69, which extends downwardly from each panel frame member element 22A to the intermediate corner frame member element 20A, where it is attached in a controllably adjustable manner with respect thereto by any of a plurality of rings 70 hooked over corresponding hook means, indicated generally at 71, carried by the inner apex 20A*c* of the corner frame member element 20A, thus providing an arrangement where each of the panel frame members 22 may be controllably moved against the action of the biasing springs 62 downwardly from the fully extending sun shield position shown fragmentarily in Fig. 5 and shown, after the cover means has been mounted over the apparatus, in Fig. 1 into the fully downwardly deflected position shown in Fig. 2, or may be positioned at various discrete positions therebetween depending upon the location of the fastening rings 70 along the tensile members 69.

Figure 13:
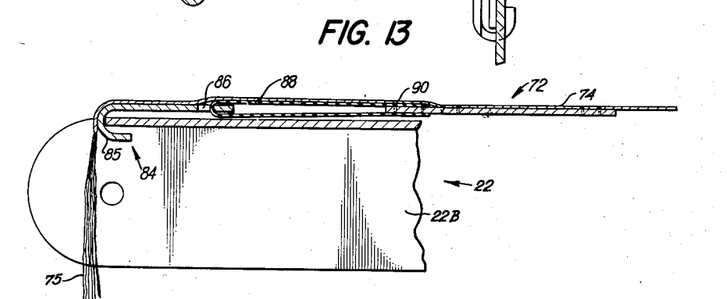
Fig. 13 is a fragmentary view, partly in section and partly in elevation, taken in the direction of the arrows 13—13 of Fig. 6, and including the thin-sheet material of the flexible cover means and the fastening clamp means adapted to be removably hooked over an end portion of the panel frame member whereby to effectively removably fasten the cover means with respect thereto.
Figure 14:
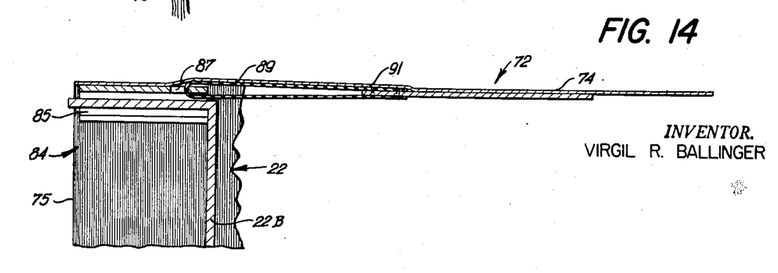
Fig. 14 is a view taken in the direction of the arrows 14—14 of Fig. 6 but also showing another portion of the cover means fastened at right angles to the same fastening clamp shown in Fig. 13.
Figure 17:
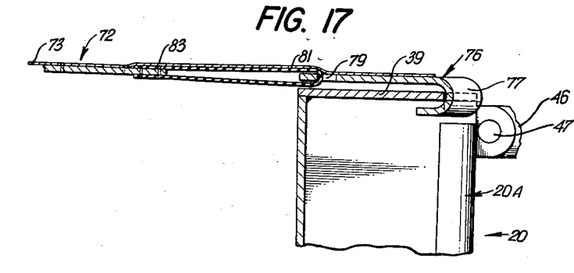
Fig. 17 is an enlarged fragmentary sectional view taken in the direction of the arrows 17—17 of Fig. 5, but including another portion of the thin-sheet material of the flexible cover means connected at right angles to the portion of the thin-sheet cover means shown in Fig.

The present invention also includes flexible cover means, such as is indicated generally at 72, which may be made of any suitable fabric or other thin-sheet material of plastic or any other suitable composition and which consists of a central substantially rectangular portion 73 and four substantially rectangular panel portions 74 adapted to be positioned between adjacent panel frame members 22 of each pair of the eight panel frame members. Each of the panel portions 74 of the cover means 72 is provided with depending fringe means 75 over the outer end of the panel comprising the panel portion 74 and the two panel frame members 22 carrying same. The cover means 72 is removably engaged with respect to the frame by a plurality of fastening clamp means including four fastening clamps, one of which is indicated in detail generally at 76 in Fig. 5, adapted to lie immediately over the triangular plate 39 of each of the corner hinge members 23 and to be removably hooked thereover by curled hook portions 77, with perpendicularly related slot portions 78 and 79 being adapted to carry respectively looped elastic portions 80 and 81 sewn as indicated at 82 and 83, respectively, to the thin-sheet cover means 72 in mutually perpendicular relationship, thus providing a quickly engageable and disengageable arrangement for fastening in two mutually perpendicular directions, and in an elastic manner, each of the four corners of the cover means 72 to each of the corner hinge means 23. Also, included are eight additional fastening clamps, one of which is shown in Fig. 6 at 84 at the outer end of panel frame member 22B and which is shown in two mutually perpendicular cross-sections in Figs. 13 and 14; it being understood that all of the other seven fastening clamps are similar. Each of the fastening clamps 84 has an outer rolled or turned back edge 85 adapted to removably engage the end of the flat top flange portion of the outer panel frame member 22B and is provided with two mutually perpendicular slots 86 and 87 adapted to carry respectively looped elastic portions 88 and 89, sewn as indicated at 90 and 91, respectively, to the thin-sheet cover means 72 in mutually perpendicular relationship, thus providing a quickly engageable and disengageable arrangement for fastening in two mutually perpendicular directions and in an elastic manner each of the eight corners of the four panel portions 74 of the cover means 72 to each of the outer ends of the panel frame member elements 22B.

Figure 20:
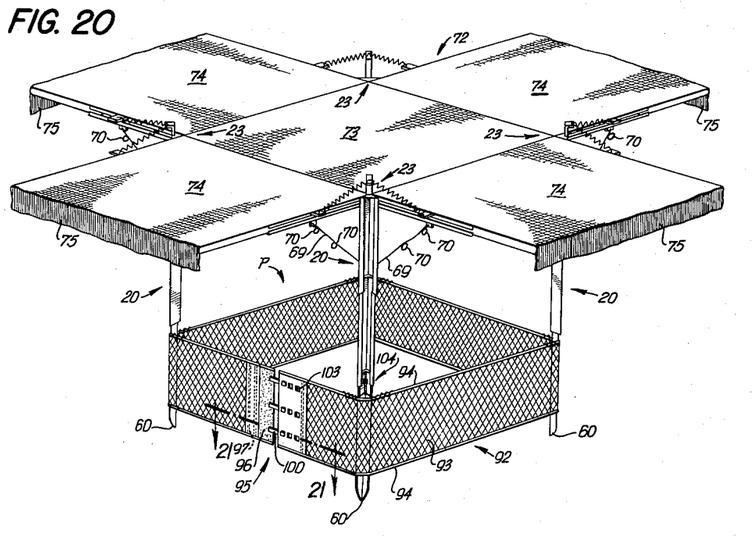
Fig. 20 is a reduced-size perspective view quite similar to Fig. 1 and shows the same structure as illustrated in Fig. 1, with the addition to the bottom portion thereof of auxiliary apparatus for converting it into a baby's play pen.

Figs. 20–23 illustrate additional attachment means cooperable with the lower telescopic element or portion of each of the four corner frame members when in upright position, for effectively converting the bottom portion of the frame into an infant's play pen, which in the specific form illustrated in Figs. 20–23 includes a flexible wall, indicated generally at 92, preferably made of mesh-like material consisting of a plurality of interwoven strands 93 of flexible tensile material fastened at the top and bottom to the flexible top and bottom tensile members 94 whereby to provide a flexible and readily foldable wall which is adapted to be placed in encircling relationship, as shown in Fig. 20, around the lower portions of each of the four corner frame members 20 whereby to effectively define an enclosure approximately 16 inches high, although not specifically so limited, effectively defining an infant's play pen therein, indicated generally at P.

In the specific example illustrated, opposite ends of the flexible mesh wall 92 are provided with suitable fastener means, indicated generally at 95, adapted to fasten the opposite ends of the flexible wall 92 together around the lower portions of the upstanding four corner frame members 20 in the manner shown in Fig. 20, when desired, and yet adapted to be controllably unfastened or disengaged when the flexible mesh wall 92 is to be removed and folded up for convenient storage or transport, usually in a carrying case (not shown) adapted to carry the remainder of the completely folded apparatus from one use location to another. In the specific example illustrated, the fastener means 95 consists of a flexible thin-sheet member 96 fastened in any suitable manner, such as by the sewing, or the like, indicated at 97, to one end of the flexible mesh wall 92 and having a piece of elastomeric material 98 fastened by suitable fastening means, such as the sewing indicated at 99, to the member 96 and provided with a plurality of vertically spaced hook means 100 at the outer end of the elastomeric member 98. Said fastener means 95 also consists of a flexible thin-sheet member 101 fastened in any suitable manner, such as by the sewing, or the like, indicated at 102, to the other end of the flexible wall 92; said flexible thin-sheet member 101 having a plurality of transversely and vertically spaced apertures carrying through-grommets or eyelet type fitting members 103 adapted to prevent the thin-sheet material 101 from tearing upon reception of the plurality of hooks 100 therethrough in the manner best shown in Fig. 21 whereby to effectively fasten the flexible wall 92 around the lower portions of the four corner frame members 20 in the manner shown in Fig. 20. The plurality of apertured eyelet fittings 103 allows adjustable engagement of the plurality of hooks 100 with any of the three vertically aligned sets of the apertured eyelets 103 for adjusting the overall tension of the flexible wall 92 and to compensate for slight variations in positioning of the lower portions of the corner frame members 20. The elastic 98 also aids in providing such adjustment.

Figure 21:
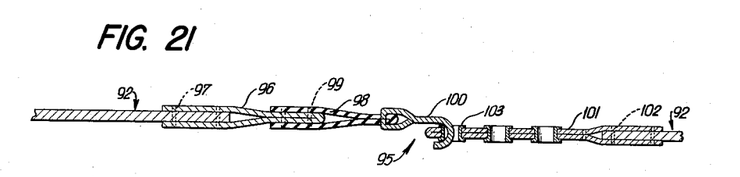
Fig. 21 is an enlarged fragmentary sectional view taken in the direction of the arrows 21—21 of Fig. 20.

It should be noted that in Fig. 21 the opposite ends of the vertical wall 92 are shown in a simple cross-hatched form somewhat different from the actual appearance of the mesh fabric of which the wall 92 is formed. This is done for drawing simplification reasons.

Figure 22:
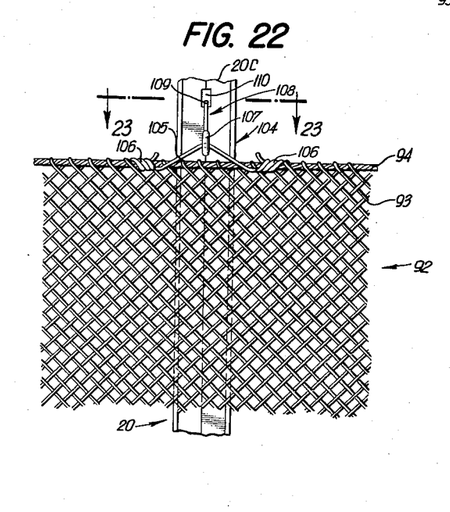
Fig. 22 is an enlarged fragmentary elevational view of a portion of the mesh material comprising the flexible wall encircling the bottom portions of the four upwardly directed frame members whereby to define a play pen, and shows a portion of said flexible mesh wall and a fastener for hooking it with respect to one of the upwardly directed frame members.
Figure 23:
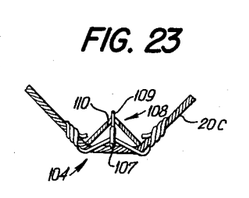
Fig. 23 is an enlarged fragmentary sectional view taken in the direction of the arrows 23—23 of Fig. 22.

Fig. 22 shows in detail one of four similar fastener means for effectively fastening the upper edge of the flexible wall 92 to each of the four corner frame members 20. One exemplary form of such fastening means is indicated generally at 104, as best shown in Fig. 22, and consists of a tensile member 105 having opposite ends fastened, as indicated at 106, to the top tensile member 94 of the flexible wall 92 at longitudinally spaced locations and having a center portion fastened to the eye part 107 of a fastening element, indicated generally at 108, having a hook portion 109 hooked through a slot 110 in the lower element 20C of the corner frame member 20 whereby to effectively removably mount the upper edge of the flexible wall at each of the four corners thereof as it passes around the outside of each of the four lower portions 20C of each of the four corner frame members 20.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A collapsible portable enclosure and sun shield apparatus, comprising: a collapsible knock-down frame including four normally vertical corner frame members, four normally horizontal top frame members, four pairs of panel frame members, and four upper outer corner hinge members, each pivotally joining adjacent ends of one of said corner frame members, two of said top frame members, and two of said panel frame members for pivotal movement with respect to said corner frame member in mutually perpendicular planes between fully extended substantially horizontal positions and fully collapsed similarly oriented positions in closely adjacent nested relationship with respect to said corner frame member; and flexible cover means comprising thin-sheet flexible material effectively carried by and extending over the four top frame members and the eight panel frame members and provided with controllably engageable and disengageable fastening means at the ends thereof for removably engaging same whereby said cover means can be removed for compact folding and convenient storage together with the collapsed frame during periods of non-use; each of said corner frame members consisting of a plurality of longitudinally controllably extendably engaged elements which may be extended into a fully extended position and which may be retracted into a fully retracted non-use position.

2. A collapsible portable enclosure and sun shield apparatus, comprising: a collapsible knock-down frame including four normally vertical corner frame members, four normally horizontal top frame members, four pairs of panel frame members, and four upper outer corner hinge members, each pivotally joining adjacent ends of one of said corner frame members, two of said top frame members, and two of said panel frame members for pivotal movement with respect to said corner frame member in mutually perpendicular planes between fully extended substantially horizontal positions and fully collapsed similarly oriented positions in closely adjacent nested relationship with respect to said corner frame member; and flexible cover means comprising thin-sheet flexible material effectively carried by and extending over the four top frame members and the eight panel frame members and provided with controllably engageable and disengageable fastening means at the ends thereof for removably engaging same whereby said cover means can be removed for compact folding and convenient storage together with the collapsed frame during periods of non-use; each of said panel frame members consisting of two longitudinally controllably extendably engaged elements which may be extended into a fully extended position and which may be retracted into a fully retracted non-use position.

3. A collapsible portable enclosure and sun shield apparatus, comprising: a collapsible knock down frame including four normally vertical corner frame members, four normally horizontal top frame members, four pairs of panel frame members, and four upper outer corner hinge members, each pivotally joining adjacent ends of one of said corner frame members, two of said top frame members, and two of said panel frame members for pivotal movement with respect to said corner frame member in mutually perpendicular planes between fully extended substantially horizontal positions and fully collapsed similarly oriented positions in closely adjacent nested relationship with respect to said corner frame member; and flexible cover means comprising thin-sheet flexible material effectively carried by and extending over the four top frame members and the eight panel frame members and provided with controllably engageable and disengageable fastening means at the ends thereof for removably engaging same whereby said cover means can be removed for compact folding and convenient storage together with the collapsed frame during periods of non-use; each of said corner frame members consisting of a plurality of longitudinally controllably extendably engaged elements which may be extended into a fully extended position and which may be retracted into a fully retracted non-use position; and wherein each of said panel frame members consists of two longitudinally controllably extendably engaged elements which may be extended into a fully extended position and which may be retracted into a fully retracted non-use position.

4. Enclosure apparatus controllably convertible to a sun shield and collapsible into a small compact carrying-case-mounted non-use form adapted to be carried in a carrying case, comprising: a collapsible knock-down frame including four normally vertical corner frame members, four normally horizontal centrally lockably hinged top frame members, four pairs of panel frame members, and four upper outer corner hinge members, each pivotally joining adjacent ends of one of said corner frame members, two of said top frame members, and two of said panel frame members for pivotal movement with respect to said corner frame member substantially in two mutually perpendicular planes between fully extend positions lying substantially in a horizontal plane and fully collapsed normally vertically oriented positions in closely adjacent nested relationship with respect to said normally vertically directed corner frame member; and flexible cover means comprising thin-sheet flexible material effectively carried by and extending over the four top frame members and the four pairs of panel frame members and provided with controllably engageable and disengageable fastening means at the ends thereof for removably engaging same whereby said cover means can be removed for compact folding and convenient storage together with the collapsed frame during periods of non-use; each of said corner frame members consisting of a plurality of longitudinally controllably extendably engaged elements which may be extended into a fully extended position and which may be retracted into a fully retracted non-use position.

5. Enclosure apparatus controllably convertible to a sun shield and collapsible into a small compact carrying-case-mounted non-use form adapted to be carried in a carrying case, comprising: a collapsible knock-down frame including four normally vertical corner frame members, four normally horizontal centrally lockably hinged top frame members, four pairs of panel frame members, and four upper outer corner hinge members, each pivotally joining adjacent ends of one of said corner frame members, two of said top frame members, and two of said panel frame members for pivotal movement with respect to said corner frame member substantially in two mutually perpendicular planes between fully extended positions lying substantially in a horizontal plane and fully collapsed normally vertically oriented positions in closely adjacent nested relationship with respect to said normally vertically directed corner frame member; and flexible cover means comprising thin-sheet flexible material effectively carried by and extending over the four top frame members and the four pairs of panel frame members and provided with controllably engageable and disengageable fastening means at the ends thereof for removably engaging same whereby said cover means can be removed for compact folding and convenient storage together with the collapsed frame during periods of non-use; each of said panel frame members consisting of two longitudinally controllably extendably engaged elements which may be extended into a fully extended position and which may be retracted into a fully retracted non-use position.

6. Enclosure apparatus controllably convertible to a sun shield and collapsible into a small compact carrying-case-mounted non-use form adapted to be carried in a carrying case, comprising: a collapsible knock-down frame including four normally vertical corner frame members, four normally horizontal centrally lockably hinged top frame members, four pairs of panel frame members, and four upper outer corner hinge members, each pivotally joining adjacent ends of one of said corner frame members, two of said top frame members, and two of said panel frame members for pivotal movement with respect to said corner frame member substantially in two mutually perpendicular planes between fully extended positions lying substantially in a horizontal plane and fully collapsed normally vertically oriented positions in closely adjacent nested relationship with respect to said normally vertically directed corner frame member; and flexible cover means comprising thin-sheet flexible material effectively carried by and extending over the four top frame members and the four pairs of panel frame members and provided with controllably engageable and disengageable fastening means at the ends thereof for removably engaging same whereby said cover means can be removed for compact folding and convenient storage together with the collapsed frame during periods of non-use; each of said corner frame members consisting of a plurality of longitudinally controllably extendably engaged elements which may be extended into a fully extended position and which may be retracted into a fully retracted non-use position; and wherein each of said panel frame members consists of two longitudinally controllably extendably engaged elements which may be extended into a fully extended position and which may be retracted into a fully retracted non-use position.

References Cited in the file of this patent

UNITED STATES PATENTS

| | | |
|---|---|---|
| 381,025 | Parmelee | Apr. 10, 1888 |
| 2,700,389 | Butcher et al. | Jan. 25, 1955 |
| 2,882,913 | Beauregard | Apr. 21, 1959 |